(No Model.)

R. G. BROWN.
TELEGRAPHY.

No. 358,379.

3 Sheets—Sheet 1.

Patented Feb. 22, 1887.

(No Model.) 3 Sheets—Sheet 2.

R. G. BROWN.
TELEGRAPHY.

No. 358,379. Patented Feb. 22, 1887.

Witnesses
Geo. W. Breck
N. D. Manson

Inventor
Robert G. Brown,
By his Attorneys
Baldwin, Hopkins & Payson.

(No Model.)
R. G. BROWN.
TELEGRAPHY.
No. 358,379. Patented Feb. 22, 1887.
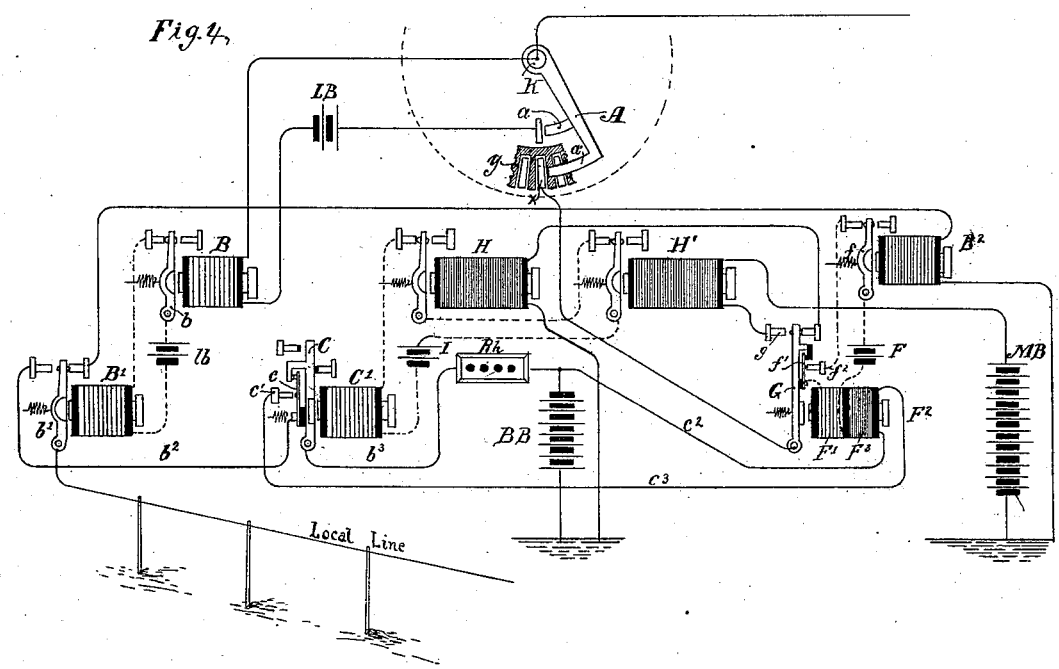
WITNESSES:
INVENTOR
Robert G. Brown,
BY his Attorneys
Baldwin, Hopkins & Peyton.

UNITED STATES PATENT OFFICE.

ROBERT G. BROWN, OF BROOKLYN, ASSIGNOR TO THE STANDARD MULTIPLEX TELEGRAPH COMPANY, OF NEW YORK, N. Y.

TELEGRAPHY.

SPECIFICATION forming part of Letters Patent No. 358,379, dated February 22, 1887.

Application filed April 20, 1886. Serial No. 199,540. (No model.)

*To all whom it may concern:*

Be it known that I, ROBERT G. BROWN, of Brooklyn, in the county of Kings and State of New York, have invented certain new and useful Improvements in Telegraphy, of which the following is a specification.

My invention relates to printing-telegraphy; and it consists in certain new organizations whereby printing-instruments run locally may be used in what is known as "synchronous telegraphy." It has heretofore been proposed in such a system to run the printers by impulses of electricity transmitted over the main line. This is objectionable, principally on account of the difficulty of running the instruments properly by the necessarily brief impulses.

In Letters Patent of the United States No. 322,693, granted to P. B. Delany and E. A. Calahan, is shown a system of synchronous telegraphy in which the printer-actuating devices are controlled or set into operation intermittently by main-line currents, and in United States Patent No. 322,689, granted to P. B. Delany, a similar arrangement is shown. In my arrangement, however, the actuation of the printers is local and independent of main-line currents. This will appear clear from the following specification.

The principal objects sought to be attained by my invention are the independent operation of a number of printing-instruments over one wire at practically the same time; to run such instruments at different rates of speed, according to the requirements of each circuit; to have but one main battery at each station, and this battery situated at the central office or terminal of the main line; to provide for the location in the central office of the principal relays of the various operators, together with their local batteries, &c.; to run the type-wheels of the various instruments locally from the terminal or main office and independently of the main line; to transmit a current over the main line only when it is desired to take an impression from the type-wheel; to make use of but one wire for connecting each printing-instrument with the main or central office, and to provide each instrument with a unison device by means of which the corresponding printers may be brought to unison.

Figure 1:
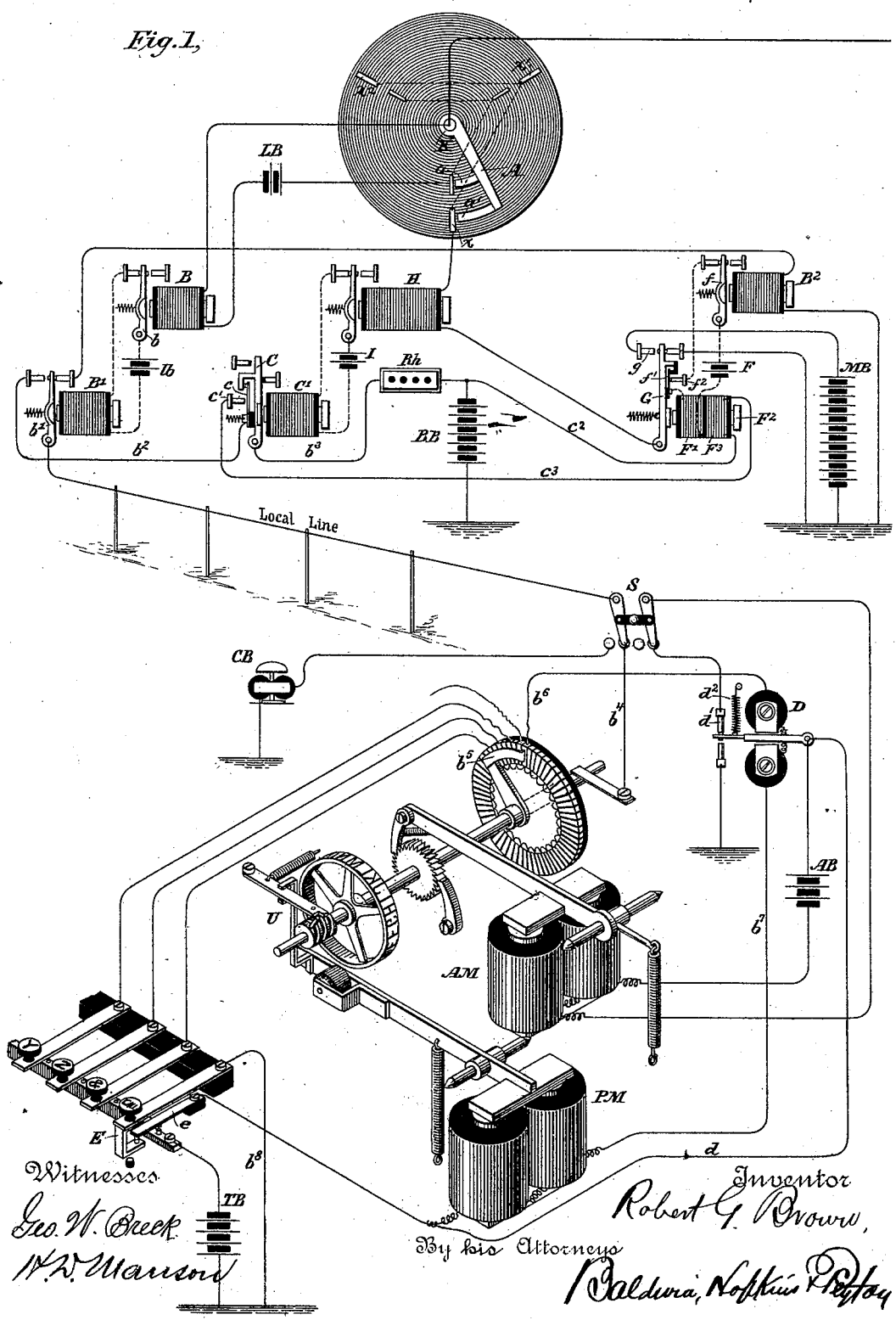
Figure 2:
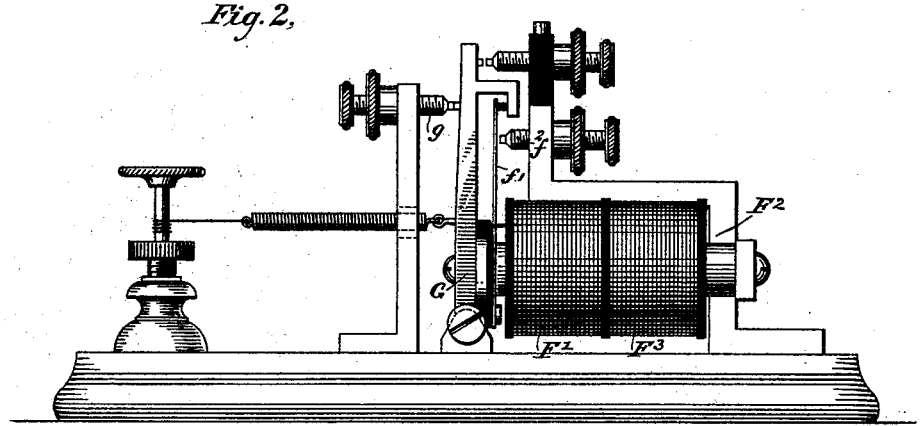
Figure 3:
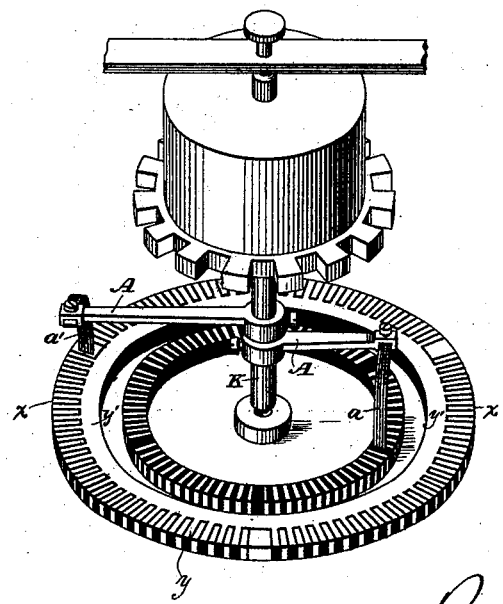

In the accompanying drawings, Figure 1 is a diagram view illustrating one set of operator's instruments connected with three contacts or segments disposed at equal intervals in the circle of contacts of a synchronously-moving apparatus. Of course each operator may have less or more than three contacts, if desired. Fig. 2 is a detail view of a relay having double sets of coils, the purpose of which presently appears. Fig. 3 is a detail view of a way of arranging the circle of segments and means for adjusting the rotating trailers which may be employed at the ends of the line; and Fig. 4 is a diagram view of one station, showing a slightly-modified arrangement of the apparatus.

Referring specially to Fig. 1, a rotating arm, A, may be actuated and maintained in synchronism with reference to the apparatus at a distant station in ways shown in various patents heretofore granted, or in any other suitable manner. Upon a frame or table over which the arm moves are arranged two series of contacts or segments, the inner series or circle being used to effect the local actuation of the type-wheels and the larger circle to effect the transmission of the letters or messages to be printed. This arrangement of segments is shown clearly in Fig. 3, as well as being indicated in Fig. 1.

In Fig. 3 the trailing fingers $a\ a'$, which run on the circles of segments, are mounted upon different arms to facilitate adjustment; but they may, as shown in Fig. 1, both be carried by the rotating arm A.

A local battery, LB, has one pole connected with the segments in the inner circle. In the drawings three segments, preferably located at equal distances from each other, are used for that purpose. The opposite pole of the battery is connected through the coil of a magnet, B, with the hub or spindle of the rotating arm K. Whenever the trailer or circuit-completer $a$ makes contact with one of the segments with which the local battery LB is connected, the circuit of that battery is completed, the magnet B is briefly energized, attracts its armature $b$, and opens the circuit of a normally-closed local battery, $lb$, in which is included the coil of a magnet, B'.

The armature $b'$ of the magnet B' is normally drawn against its front stop, thus connecting the local line through the coil of a magnet, $B^2$, to earth; but when its circuit is opened the armature $b'$ goes to its back stop, thus connecting the local or operator's line through that stop and a wire, $b^2$, with an insulated spring-finger, $c$, carried on an armature, C, controlled by a magnet, C'. When the armature C is in the normal position shown, the spring-finger $c$ makes contact with a hook or shoulder thereon, and the circuit, now being traced from the local line, is completed through the armature C, wire $b^3$, and resistance Rh to the pole of a battery, BB, the opposite pole of which is grounded. During the brief time, therefore, that the armature $b'$ is on its back-stop, an impulse passes from the battery BB through the resistance Rh over the local line to the switch S. This switch being in the position shown in the drawings, the impulse passes by wire $b^4$ to the spindle of the type-wheel, and thence to the rotating trailing finger $b^5$, of what is known in printing-telegraphy as the "sunflower."

The alternate contacts or segments in the sunflower are connected together, as shown, and by wire $b^6$ through the coils of a biased polarized relay, D, thence by wire $b^7$ through the coils of a press-magnet, PM to a spring-finger, $e$, on the key-board, calling-key E, and wire $b^8$ to earth. During the pauses of the trailer $b^5$ on the sunflower, or when the apparatus is in the normal condition, as shown, the trailer rests on a relay-segment connected with wire $b^6$. When, therefore, the armature $b'$, which forms the end of the local line at the main or central office, goes to its back stop, an impulse will be received from the battery BB through the resistance Rh, and through the polarized relay and press-magnet to earth. The coils of the press-magnet are of such a low resistance that this current does not produce an effect therein sufficient to move the press-lever; but the armature of the polarized relay D, which is biased by a spring, $d^2$, is caused to go to its lower stop, thus opening the circuit of the battery AB, which includes the coils of the type-wheel magnet AM. This circuit may readily be traced from one pole of the battery through the coils of the type-wheel magnet to one of the insulated arms of the switch S and upper stop, $d'$, of the armature of the relay D, with which the opposite pole of the battery is connected. This is the normal condition, the type-wheel armature-lever being drawn down; but when an impulse of electricity is received the armature of the relay D goes to its lower contact, thus opening the circuit of the battery AB at the point $d'$. Every time, therefore, that the armature $b'$ goes to its back stop the type-wheel magnet AM is demagnetized and its armature-lever is thrown up by its spring. When the trailing finger $a$ leaves its contact, the normal condition is re-established, the armature-lever drawn down, and the type-wheel shaft rotated one step.

The apparatus of corresponding operators being connected to corresponding segments of synchronously-moving apparatus at the two terminal stations of a main line, the instruments will be actuated in unison.

The instruments are provided with an ordinary form of unison device, U, which is well understood.

A branch, $d$, taken from the wire $b^7$, between the ground and the press-magnet, is connected with the armature-lever of the polarized relay, and when the lever goes to its lower stop the branch is grounded, for a purpose presently explained.

A transmitting-battery, TB, is connected with the bottom rail or conducting-strip of the key-board, while the several letter or character keys are connected with their respective segments on the sunflower arranged between the alternate segments which are connected with the coil of the relay D. When an operator is transmitting, he depresses the keys and connects the battery TB through the particular key depressed, through its particular segment in the sunflower, through the trailer of the sunflower as it passes from one polarized relay-segment to another, and by way of the trailer, type-wheel spindle, wire $b^4$, and switch S, over the local line to the armature $b'$ at the main office.

It will be observed that such transmitting impulses from the battery TB must be sent from the operator's instrument to the armature $b'$ when the trailer of the sunflower is passing from one relay-segment over a letter-segment to the next relay-segment. This occurs in the organization shown when the type-wheel armature-lever is being drawn down by its magnet, and the closing of the local circuit of the type-wheel magnet occurs when the trailer $a$ passes from its segment and the armature $b'$ is drawn from its back stop. It should also be noted that the first action of a received impulse on the printing apparatus is to cause the rising of the type-wheel lever by the opening of its local circuit without moving the type-wheel shaft, and if such an impulse should also be a printing-impulse the press-lever would be actuated and the impression taken while the type-wheel-actuating lever was raised and the type-wheel at rest.

When the transmitting-keys are depressed, the armature $b'$ being on its front stop, the battery TB finds a ground through the relay or magnet $B^2$. This magnet attracts its armature $f$ away from its back stop, thus opening the local circuit of a battery, F, which includes one of the pairs of coils F' of a magnet, $F^2$. This local circuit can easily be traced from one pole of the battery F through the coils F' to the insulated spring-finger $f'$ on the armature G, its stop $f^2$, the back stop of armature $f$, to the other pole of the battery. Therefore, when the armature $f$ leaves its back stop during the passage of the sunflower-trailer across the segment of a depressed key, the armature G is released and is drawn by its spring against its back stop, $g$, where it remains, because it has left its own local circuit open at the insulated spring-finger $f'$ and stop $f^2$. The stop $g$ is connected with the main battery MB, and the battery is therefore connected through the stop $g$, armature G, and coils of the main-line relay H to the message-segments of the outside circle of segments of the synchronous apparatus.

The battery MB is connected with its segments $x\, x'\, x^2$ after the armature $b'$ arrives on its front stop, because as the trailers $a$ and $a'$ left their segments the armature $b$ went to its back stop and the armature $b'$ started for its front stop, opened the circuit through the polarized relay, and permitted its armature to be drawn by its spring against its upper stop, $d'$, thus closing the circuit of the type-magnet AM and causing the sunflower-trailer to be carried across the segment of the depressed key just after the armature $b'$ had arrived on its front stop.

In the arrangement shown in Fig. 1 the message-segments and the segments for accomplishing the local actuation of the instrument, as above described, are arranged in the same radial lines.

Upon the further rotation of the trailers $a$ $a'$ they respectively come upon their next segment. The impulse from the main battery MB therefore passes to line through the segment $x$ or $x'$ or $x^2$, trailer $a'$, and line to the distant station. At the distant station as well as at the sending-station, the effect is to take an impression from the type-wheel before it has been moved by its actuating armature-lever. At each station this is accomplished by the battery BB in the following way: The outgoing impulse from the battery MB at the station shown in the drawings energizes the magnet H, which attracts its armature, thus opening the circuit of the local battery I. The same effect is produced at the receiving-station by the passage of the transmitted impulse from the segment $x$ or $x'$ or $x^2$ through a relay, H, armature G, and its front stop (against which it normally rests) to earth. At each station the opening of the circuit of the local battery I permits the armature C to be drawn against its back stop. As this is being done the insulated spring-finger $c$ on the armature C strikes against a fixed stop, $c'$, thus disconnecting the finger from the hook or shoulder on the armature C, and, without opening the circuit of the battery BB, makes a circuit by way of a wire, $c^2$, through the coils $F^3$ on the magnet $F^2$, thence by wire $c^3$, stop $c'$, insulated spring-finger $c$, and wire $b^2$ to the back stop of the armature $b'$. This armature is against its back stop, because when the trailer $a'$ came upon its message-segment the trailer $a$ came upon its segment, and the magnets B and H attracted their armatures at the same moment from their back posts, thus releasing and allowing the armatures $b'$ and C to arrive on their back posts at the same time.

The impulse from the battery BB, which this time does not pass through the resistance Rh, and has therefore a much greater effective power, passes over the local line through the switch, type-wheel spindle, sunflower-segment, relay, and press-magnet to earth, as before described. The polarized relay-armature goes to its lower stop, thus opening the circuit of the type-wheel battery AB and permitting the type-wheel lever to rise; but there is no movement of the type-wheel shaft. The current at the same time energizes the press-magnet, the armature of which takes an impression from the type-wheel. The passage of this current through the coils $F^3$ of the magnet $F^2$ draws its armature G to its front stop, thus re-establishing the local circuit of the battery F at the spring-finger $f'$ and stop $f^2$, which is its normal condition. This disconnects the battery MB from the message segments and puts them to ground through the main relay H and front stop of the armature G, as shown in Fig. 1.

As soon as the trailers pass from their respective segments the armature $b'$ goes to its front stop, the relay-armature D goes to its top stop, $d'$, re-establishing the circuit of the type-wheel battery AB, the type-wheel lever is drawn down by its magnet, and the type-wheel shaft rotated one step.

The receiving-operator at the distant station can at any time break the sender by depressing his calling-key E, or any of its transmitting-keys, thereby sending impulses to the transmitting-station, which break up the message being printed there. The depression of the calling-key E is limited by an insulated stop, and when depressed it passes out of contact with the spring-finger $e$, which, by its own resilience, descends upon the rail of the key-board with which the battery TB is connected. An impulse from this battery is therefore sent through the press-magnet, polarized relay, and sunflower-contacts over the local line to the armature $b'$, and whenever the armature is in contact with its front stop the relay $B^2$ is actuated and sends impulses from the main battery MB through the main line H, as before described. The current from the battery TB need not be of sufficient strength to actuate the press-magnet, and its polarity is such as not to affect the position of the armature of the polarized relay.

When the operator is neither sending nor receiving, he has the switch S moved to the left, thus opening the local circuit of the battery AB and closing the local line from the central office through the call-bell CB, which is of so low a resistance that a current coming over the local line from the battery BB through the resistance Rh does not produce an effect thereon; but should the resistance Rh be cut out of the local-line circuit by the operator at the distant station sending impulses over the main line by his calling-key, or otherwise, then the call-bell magnet would be sufficiently energized to attract its armature and ring the bell.

When the operator receives a call, he moves his switch to the right and depresses his calling-key, thus answering the signal and starting his instrument into operation by throwing off the unison-check, the operation being as follows: The depression of the key connects the transmitting-battery TB through the spring-finger $e$, coil of press-magnet, and polarized relay to armature $b'$, its front stop, and the magnet $B^2$ to earth. This causes an impulse or series of impulses, to be sent from the main battery MB through the main-line relay H, thus transmitting the signal to the distant station, and also causing a current to pass from the battery BB outside of the resistance over the local line. As the operator will probably not have raised his finger from the calling-key when this current arrives at the spring-finger $e$, it finds a ground through the transmitting-battery TB, which is of an opposite polarity. The current being thus partly neutralized, may not be of sufficient strength to cause the press-magnet to attract its armature-lever with sufficient force to throw off the unison, but is strong enough to send the armature of the polarized relay to its lower stop, and this affords a ground for the current by way of the branch circuit $d$ and armature of the polarized relay. The full power of the current therefore becomes effective in the coils of the press-magnet, the unison is thrown off, and the instrument started. Whenever the instruments are allowed to come to unison, the sender can, in like manner, start them at both stations by depressing his calling-key.

Any of the corresponding pairs of operators may have one or more message and local actuating circuit-contacts, so as to give each circuit the desired speed of transmission. Where seventy-two message-contacts are employed, as has been proposed and practiced in synchronous telegraphy, it will be obvious that a large number of printers may be worked upon a single main line at practically the same time without in the slightest degree interfering with each other.

In Fig. 3 the message-segments are shown as separated by other segments, $y$, which are preferably formed in one piece with the ring $y'$. Where the apparatus is used upon a line of such length as to give rise to a disturbing static discharge as the trailers pass from the message-segments, the plate $y'$ may be connected with the earth, so that the main line will be discharged at each station between the breaks and makes of the circuit. This has been fully set forth in a patent heretofore granted to Patrick B. Delany.

I have shown the ground segments $y$ in Fig. 4.

In operating my improved printer system on a short line there would be no disturbing static discharge, and the plate $y'$ would not therefore be connected with the earth. The segments $y$ would serve simply to space or separate the message-segments; but when working on a comparatively long line the ground-plate would be connected with the earth to discharge the line. This fact may cause a slight imperfection in the operation of the apparatus when arranged as shown in Fig. 1, due to the fact that the trailer will bridge from a ground-contact to a segment-contact from which a current is passing into the line.

Suppose the operator at the apparatus shown in Fig. 1 was receiving, the adjustment of the relay H would have to be low, so that its armature could be drawn forward by the currents coming over the main line from the distant station. If the operator is sending, the main battery is connected to his segment through the relay H. As the trailer passes from the ground-segment onto the message-segment with which the battery is connected, it may bridge for a moment and the current will divide, part being short-circuited through the ground-segment and part going to line. The same thing might occur when the trailer passes off the message-segment. This short-circuiting of the heavy main-battery current through the relay and ground-plate causes the armature of the relay H to be drawn forward with considerable force, and as its adjustment is low the armature will stick on its front point until the residual magnetism has left the core of the relay. If the spring of the armature be adjusted high enough to overcome this residual magnetism, the relay will not respond properly to currents coming over the line from the distant station. The arrangement shown in Fig. 4 is designed to overcome this difficulty. As there shown, the message-segment is connected direct to the armature G, instead of being connected to the armature through the coil of the relay H, as in Fig. 1. This armature is normally on its front post, which is connected through the relay H to earth. Of course the reception of impulses will take place in exactly the same way as described in connection with Fig. 1.

In order to record the outgoing impulses, I employ a supplemental relay, H', the armature and back stop of which are included in the circuit of the battery I. One end of the coil of this relay is connected with the back stop, $g$, of the armature G, and the opposite end is connected with the main battery. When the transmitting-key is depressed, the armature G goes to its back post, thus connecting the main battery to line through the supplemental relay H', which is properly adjusted to meet the conditions above mentioned. The other relay, H, has a low adjustment, and is only actuated by currents coming over the main line from the distant station, as above mentioned.

The organization shown and described is that deemed by me most suitable for the purpose of carrying out my invention; but so far as the broad aspect of my invention is concerned I do not limit it to such details, as doubtless other ways may be devised by electricians for accomplishing the same results without materially departing from the principles of operation.

Of course any kind of step-by-step instruments for signaling or printing may be used, and when I speak of printing-instruments I include all such apparatus.

I claim as my invention—

1. In a synchronous multiplex telegraph system, the combination, with continuously-operating synchronous apparatus forming the terminals of the main line and by means of which the printing-instruments are connected with and disconnected from the main line, of printing-instruments and local means for actuating them step by step independently of the main-line currents.

2. In a synchronous multiplex telegraph system, the combination of a main-line, continuously-operating synchronous apparatus forming the terminals of the main line and by means of which the printers are connected with and disconnected from the main-line printing-instruments, local means for operating them step by step independently of main-line currents, and transmitting devices for sending a current over the main line to transmit a signal.

3. In a synchronous multiplex telegraph system, the combination of a main line, the rotating trailers, two series of circles of segments over which said trailers pass, devices electrically connected with one series of segments for the local actuation of printing-telegraph instruments, and transmitting and receiving devices connected with the other series of segments for the transmission and reception of messages.

4. The combination, in a synchronous multiplex telegraph system, of the main line, printing-telegraph instruments, continuously-operating synchronous apparatus forming the terminals of the main line and by means of which the printers are connected with and disconnected from the main line, local means for actuating them step by step independently of main-line currents, and a single line connecting each printer with the synchronous apparatus.

5. The combination, in a synchronous multiplex telegraph system, of the main line, synchronous apparatus, printers actuated locally independently of main-line currents, a single main line connecting each printer with the synchronous apparatus, and a main battery located at the synchronous apparatus or central office.

6. The combination, in a synchronous multiplex telegraph system, of a main line, synchronous apparatus, printing-instruments actuated locally independently of main-line currents, a single line connecting each printer with the synchronous apparatus or central office, the main-line relay for each printer located at the central office, and a main battery from which currents are transmitted over the main line.

7. The combination of the main line, the table of segments, the synchronously-actuated trailers, printing-instruments, devices, substantially such as described, for each printing-instrument connected with one or more segments in one of the series for effecting the local actuation of the printer, a main-line relay for each printer connected with one or more segments in the other series of segments, a main battery, means for sending an impulse from the main battery through the main-line relay to the segments with which it is connected when a key of the printer is depressed, and means, substantially such as described, for sending a current to the printer at each station, whereby the printing of the transmitted signal at the sending and receiving stations is accomplished.

8. The combination of the local line, the armature $b'$, the magnet $B^2$, the circuit of a battery, F, in which the armature and one stop of said magnet are included, a coil or coils, $F'$, of a magnet, $F^2$, included in said local circuit, the main-line relay connected with the armature of magnet $F^2$, the stop against which said armature rests, normally connected to the earth, the other stop connected with the main battery, the battery BB, the circuit by which it sends a printing impulse over the local line and through the coil or coils $F^3$ of the magnet $F^2$, and the contacts $f'$ $f^2$ of the circuit of the battery F.

9. The combination of the local line, the relay and press-magnet through which the line is intermittently put to earth in the step-by-step actuation of the instrument, the relay being constructed to respond to currents which effect the step-by-step actuation of the printer and the press-magnet being constructed to respond only to currents of increased strength to effect the printing of a letter, and means, substantially such as described, whereby, when a signal is received from the main line or transmitted into the main line, a current of increased strength is sent over the local line to actuate both the relay and press magnet, as set forth.

10. The combination, substantially as set forth, of the calling-key, through which the circuit of the polarized relay and press magnet is normally grounded, a battery, TB, which is connected with said circuit when the calling-key is depressed and disconnected from said circuit, and the branch circuit $d$ grounded through the armature of the polarized relay when that relay is energized by a received current of electricity.

11. The combination, substantially as set forth, of the main line, continuously-operating synchronous apparatus forming the terminals of the main line and by means of which the printers are connected with and disconnected from the main line, printing-instruments, each connected therewith by a single wire, local means for actuating them step by step independently of main-line currents, and a unison device on each printer.

12. The combination of a main line, the synchronously-rotating apparatus, the two series of segments, printers connected with the synchronous apparatus, devices connected with one of the series of segments of the synchronous apparatus for effecting the local actuation of each printer, the type-wheel magnet AM, its normally-closed circuit, a relay or magnet which opens said circuit upon the reception of each actuating impulse from the main office, and means for actuating the press-magnet armature-lever to take an impression upon the type-wheel when the circuit of the type-wheel magnet AM is open and the type-wheel at rest.

13. The combination, substantially as set forth, of the main line, synchronous apparatus, printing-instruments, local means for operating them step by step independently of main-line currents, means for transmitting intermittent currents from the synchronous apparatus to each printer to actuate it step by step, and means for taking an impression from the type-wheel when it is at rest.

14. The combination, substantially as set forth, of the main line, the synchronously-moving trailer, the message segment or segments, the interposed ground-segments, the receiving-relay H, and the transmitting-relay H'.

15. The combination, substantially as set forth, of the sunflower and its trailer, the alternate segments of the sunflower, each connected in its key-circuit, the remaining or intermediate segments, the circuit of the latter segments, electro-magnetic type-wheel-actuating devices in said circuit, and the type-wheel.

16. The combination, substantially as set forth, of the sunflower and its trailer, the alternate sunflower-segments each connected in its key-circuit, the remaining or intermediate segments, the circuit of the latter segments, type-wheel-actuating devices in said circuit, the type-wheel, and printing devices which take an impression from the type-wheel when the trailer is at rest upon an intermediate segment.

17. The combination of a main-line transmitter, $B^2$, its main battery, the battery BB, a circuit-interrupter or vibrating armature-lever which makes contact alternately with the main-line transmitter and the battery BB, a local line of which the vibrating armature-lever forms one terminal, the type-wheel-actuating relay included in the circuit of the local line, the type-wheel, the sunflower and its trailer, key-segments across the face of which the sunflower-trailer passes when the vibrating armature-lever is on the main-line-transmitter contact, and printing devices which take an impression from the type-wheel after the trailer has crossed a key-segment and paused.

18. The combination of the vibrating armature $b'$, the local line of which it forms one terminal, the sunflower, its trailer included in the local line, the alternate segments of the sunflower connected each in its key-circuit, the intermediate or remaining segments connected in a line including the type-wheel-actuating relay and press-magnet, means for actuating the type-wheel and sunflower-trailer step by step, whereby the trailer is caused to pass over a key-segment when the armature $b'$ is on its front stop and pause upon one of the intermediate segments when it is on its back stop, and means for energizing the press-magnet to take an impression from the type-wheel when at rest.

19. The combination of the calling-key through which the circuit of the type-wheel-actuating relay and press-magnet is normally grounded, a battery, TB, which is connected with said circuit when the calling-key is depressed and disconnected from said circuit, the branch circuit $d$, grounded through the armature of the type-wheel-actuating relay when said armature is on its ground-stop, and the unison device.

In testimony whereof I have hereunto subscribed my name.

R. G. BROWN.

Witnesses:
WM. W. WIGHT,
G. H. WIRTH.